(12) United States Patent
Vamvas

(10) Patent No.: US 8,841,822 B2
(45) Date of Patent: Sep. 23, 2014

(54) POWER GENERATOR EMPLOYING PIEZOELECTRIC ELEMENTS

(76) Inventor: Vassilios Vamvas, Chester Spring, PA (US)

( * ) Notice: Subject to any disclaimer, the term of this patent is extended or adjusted under 35 U.S.C. 154(b) by 177 days.

(21) Appl. No.: 13/297,254

(22) Filed: Nov. 15, 2011

(65) Prior Publication Data

US 2012/0119624 A1    May 17, 2012

Related U.S. Application Data

(60) Provisional application No. 61/414,246, filed on Nov. 16, 2010.

(51) Int. Cl.
*H01L 41/113*    (2006.01)

(52) U.S. Cl.
USPC .......................................... 310/339

(58) Field of Classification Search
USPC .......................................... 310/339
See application file for complete search history.

(56) References Cited

U.S. PATENT DOCUMENTS

| | | | | |
|---|---|---|---|---|
| 8,022,563 | B2 * | 9/2011 | Lemieux | 290/42 |
| 2007/0257490 | A1 * | 11/2007 | Kornbluh et al. | 290/53 |
| 2008/0197635 | A1 * | 8/2008 | Torch | 290/53 |
| 2013/0161957 | A1 * | 6/2013 | Bhat et al. | 290/53 |

\* cited by examiner

*Primary Examiner* — Derek Rosenau

(57) ABSTRACT

An efficient electrical power generator employs a plurality of piezoelectric devices in a rigid container. The top cover of the rigid container is capable of moving and in direct contact with a large hydraulic cylinder. A small cylinder, hydraulically coupled with the large one, through tubing is capable to displace a liquid contained in the tubing. An input force applied on the small cylinder, is multiplied by the large cylinder, which compresses the piezoelectric devices causing them to produce an electrical output.

6 Claims, 3 Drawing Sheets

POWER GENERATOR EMPLOYING PIEZOELECTRIC ELEMENTS

CROSS-REFERENCE TO RELATED APPLICATIONS

This application claims the benefit of U.S. provisional patent application Ser. No. 61/414,246, filed 2010 Nov. 16 by the present inventor. This application incorporates by reference herein U.S. non-provisional application Ser. No. 13/284,865 filed 2011 Oct. 28 and entitled "Ocean Wave Energy Converter And Method Of Power Generation" filed by the present inventor.

FIELD OF USE

This invention relates to a power generation and, more particularly, to an electrical power generation employing piezoelectric materials that can produce electrical charge when a mechanical force is applied on them.

BACKGROUND OF THE INVENTION

Piezoelectric elements produce electrical potential, when a mechanical force is used to compress them. In comparison to conventional electromagnetic generators, piezoelectric elements have lower energy losses in heat. Materials possessing the piezoelectric effect capability include: quartz, tourmaline, Plumbum Zirconate Titanate (PZT) and Plumbum Magnesium Niobate (PMN). PZT and PMN are ceramic materials, which have shown high efficiency in generating electrical output, when mechanical stress is applied. Several configurations of piezoelectric ceramic materials are capable of producing electrical potential. One example is a stack of thin layers of rectangular or circular shape, separated by thin metallic electrodes, bonded together. The typical layer thickness is 1 mm or less per piezoelectric layer. These stacks can withstand the pressure of several tons. Piezoelectric stacks are mounted by gluing them on metal or ceramic surfaces by cold or hot curing epoxy, respectively. A guiding casing is essential when heavy loads move dynamically. This guiding casing usually includes a preload spring. The piezoelectric stacks in a guiding casing with a preload spring constitute a piezoelectric device. The stacks have their own characteristic stiffness. The preload spring must have 10% or less of the stack's stiffness for optimum performance. The maximum permissible forces depend on the operating frequency of the application in use and the maximum allowable displacement of the stack(s). A typical stack displacement is less than 1 mm. Each stack, when compressed, can generate more than 1000 Volts. The piezoelectric stacks can perform billions of cycles without any measurable wear. In practical terms their lifetime exceeds 30 years. Piezoelectric devices are commercially available from a few companies including PI Ceramic of Karlsruhe, Germany. The electrodes of these devices can be connected in series, which maximizes the combined voltage or in parallel, which, when connected to additional circuitry, the current is maximized. Combined schemes are possible. Advances in power electronics have allowed the electrical potential generated by piezoelectric stacks to deliver useful electrical power in AC or DC form, which can be stored in capacitors or be fed in the electricity grid.

An attempt for high power harvesting, utilizing piezoelectricity is described in U.S. Pat. No. 7,005,779. The generator described in this patent utilizes piezoelectric devices activated by the rotation of a cam with a special shape, which is rotated by an external source. Although the special shape of the cam compresses the piezoelectric stacks, the rotation of the cam applies also torque on the piezoelectric stacks, which may affect their stability.

The generator described herein, compresses piezoelectric devices hydraulically. The compressive force is only in one direction without involving rotation and torque, thus maintaining perfect stability of the piezoelectric stacks used.

An attempt for high power harvesting, utilizing the gravitational weight of traversing vehicles over piezoelectric devices, is described in US patent application No. 20090195226. This patent application utilizes boxes containing piezoelectric stacks, buried under the asphalt road. When a vehicle traverses over each box, activates the piezoelectric stacks inside the box. The box's width is similar to the width of a vehicle's tire. This way, all the piezoelectric stacks in the box are utilized, when the vehicle's tire passes over the box. If the box were wider than the tire, so as to fit more piezoelectric stacks, the top cover of the box would not efficiently distribute the same pressure to all piezoelectric stacks in the box. The generator described herein, has significant advantages over the "box method" of the patent application 20090195226. It allows for more piezoelectric stacks to be compressed in comparison with the "box method". This is due to Pascal's principle of physics, which explains that the pressure generated by a crossing tire over the generator is transmitted undiminished to all the points of the hydraulic fluid included in the generator. This fluid is used to transfer the pressure to a compressing piezo-stacks surface. This surface can be substantially larger in comparison to the surface of the box.

Hydraulic methods have been employed to harness energy from renewable sources such as wind and ocean waves. The usual method involved is hydraulic motors. For example, U.S. Pat. No. 4,931,662 utilizes a hydraulic motor to convert the rise and fall of the ocean waves to rotation in order to rotate an electromagnetic generator. Hydraulic motors provide rotational kinetic energy. They use the non-compressible property of the liquids to multiply a torque instead of a linear force. Hydraulic press machines utilize the non-compressible property of liquids to multiply linear forces. Hydraulic press machines typically employ two hydraulic cylinders, one small and one large hydraulically coupled through tubing containing a liquid. A small force applied to the small cylinder can be multiplied many times by the large cylinder, due to Pascal's principle. However, there is a drawback involved: in order to multiply a force, the small hydraulic cylinder must be displaced a large distance in order to cause a considerable displacement of the large hydraulic cylinder. This is probably the main reason why the hydraulic press method is not used in electrical power generation. That is, the displacement of the large cylinder, as output, cannot be used to move considerably the rotor of a linear or rotational electromagnetic generator. However, the piezoelectric power generator, described herein, exploits fully the benefits provided by this hydraulic method turning the drawback to an advantage.

SUMMARY

An electrical power generator comprises piezoelectric devices which are capable of providing an electrical output upon application of a mechanical force on the devices. The generator further comprises a hydraulic device, which includes an input piston capable of displacing a liquid in a tubing, when compressed, and an output piston hydraulically coupled with the input piston. The output piston is securely kept in position in relation to the piezoelectric devices so as to compress them when a repetitive external force is applied on the input piston.

LIST OF FIGURES

DETAILED DESCRIPTION OF FIGURES

Preferred Embodiments

Figure 1:
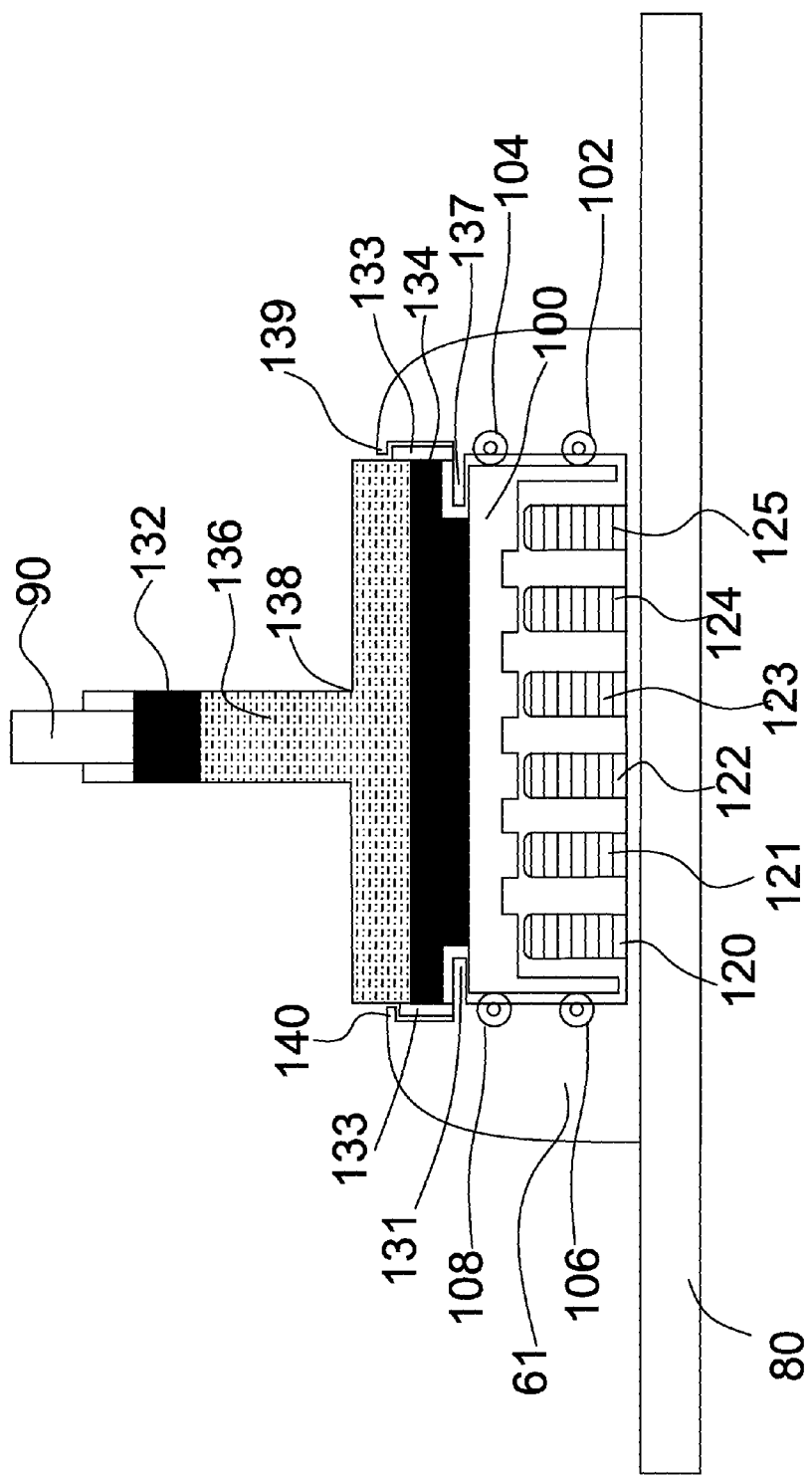
FIG. 1 shows one embodiment of the piezoelectric generator in a cross section

FIG. 1 shows a cross section of one embodiment of the piezoelectric electrical generator. The generator comprises a small input piston 90, which is connected with a small cylinder 132; a large output cylinder 134; a tubing 138 having inside a liquid 136; a rigid housing 61, which contains piezoelectric stacks such as the ones shown 120, 121, 122, 123, 124 125. A plurality of piezoelectric devices can be used. Rigid housing 61 is fixed securely on the ground or on a platform such as platform 80. Inside housing 61 there is a rigid compressing surface 100, which is free to move when it receives compression by cylinder 134. Compressing surface 100 is guided by rollers 102, 104, 106 and 108, which are attached on the frame of housing 61. More rollers can be used to assist compressive surface's side supports to move downwards, when compressed. Rigid surface 100 is prevented to roll out from housing 61, by housing 61 frame points 131 and 137. Points 131, 137, 139 and 140 attach firmly the hydraulic frame 133 and keep in proximity cylinder 134 with compressing surface 100. The input piston 90 is firmly attached to cylinder 132. When an external force is applied on input piston 90, this causes cylinder 132 to compresses liquid 136. Liquid 136, according to Pascal's principle, transfers the pressure provided by cylinder 132 to all the points on the internal surface of cylinder 134. Cylinder 134, compresses rigid surface 100, with a larger than the input force. Cylinder 134 force is equal to the input force multiplied by the ratio of the area of cylinder 134 to the area of cylinder 132. When there is no input force, rigid surface 100 simply rests on top of the piezoelectric stacks.

The piezoelectric stacks are glued at the bottom of rigid housing 61, with cold curing epoxy. Housing 61 is made of a rigid material such as steel. Liquid 136 can be oil and optionally, propylene glycol with water if antifreeze properties are necessary. The piezoelectric stacks generate an electrical output when compressed, which is transported trough electrodes and circuitry (not shown) to the grid or storage or to powering an application.

Figure 2:
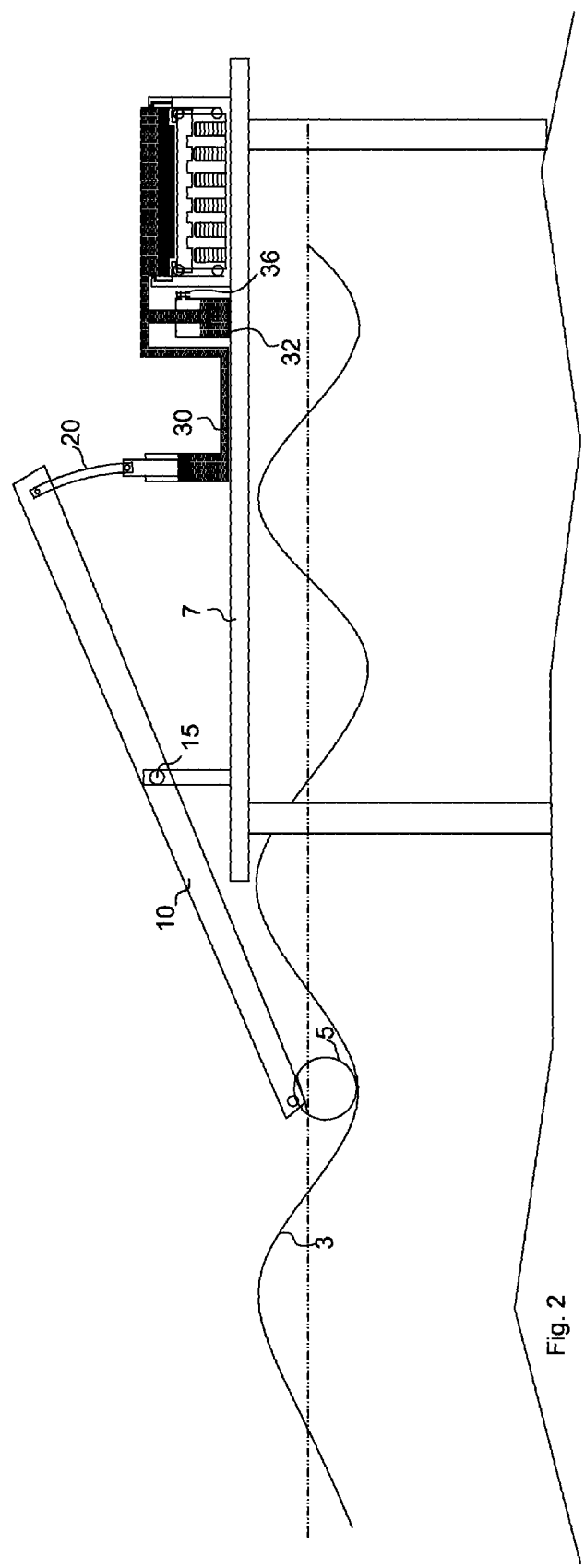
FIG. 2 shows another embodiment of the piezoelectric generator receiving its input force from the rise of the ocean waves

FIG. 2 shows the piezoelectric generator securely fixed on platform 7. Platform 7 is supported by the bottom of the sea. A buoy 5 is in direct contact with the ocean waves 3 and is attached at the end of a lever arm 10. Lever arm 10 pivots pivot 15, which is fixed on platform 7. The other end of lever arm 10 is attached to the one end of rigid shaft 20. The other end of shaft 20 is connected to the input piston. Tubing 30, of this embodiment, allows the input piston to be closer or further from the piezoelectric stacks. FIG. 2 shows buoy 5 to be in a wave trough. When buoy 5 is raised by a wave crest, the piezoelectric stacks receive maximum compression. The hydraulic circuit in this embodiment is not closed, as in the previous one, and it employs liquid reservoir 32, hydraulically connected with tubing 30 and pressure valve 36. In another embodiment check valves and control valves are also included. In another embodiment platform 7 is on the coast line.

Yet, in another embodiment, (not shown) the input force to the generator is caused by traversing vehicles over the input piston, which is placed to be at the level of the vehicles' road.

Also, in another embodiment, the input piston is securely positioned under the rail tracks where an input force is generated when the trains pass over the input piston.

Figure 3:
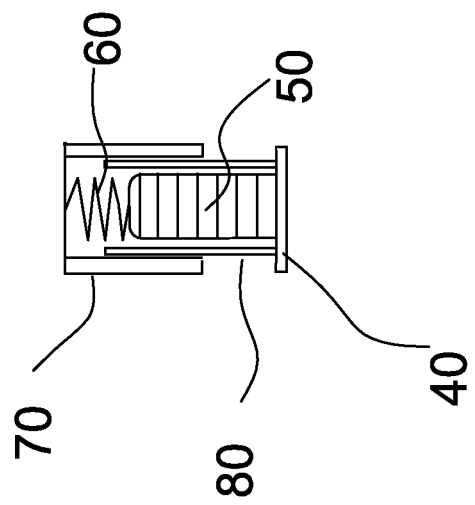
FIG. 3 shows one piezoelectric device

FIG. 3 shows a piezoelectric device. This device comprises piezoelectric stack 50, an individual housing 80 and a housing base 40. The piezoelectric stack 50 has its top end connected to spring 60. The other end of spring 60 is attached to cap 70. When the generator's large cylinder compresses cap 70, spring 60 is compressed exerting a compressing force on the piezoelectric stack, which produces an electrical voltage. This voltage is proportional to the applied force. The piezoelectric stack 50 is essentially a multi-layer capacitor which, due to its unique properties, has the ability to produce an electrical charge as the result of an externally applied mechanical stress. Electrical current is generated when stack 50 is electrically connected to an external electric circuit and is mechanically stressed in a periodic fashion.

The invention claimed is:

1. An electrical power generator comprising:
   a. At least one piezoelectric device, having a top surface and a bottom surface, securely fixed on said bottom surface and capable of providing an electrical output upon application of a mechanical force on said top surface;
   b. a hydraulic device having an input piston capable of displacing a liquid in a tubing when an input force is applied to said input piston, and an output piston, larger than said input piston, hydraulically coupled with said input piston through said liquid in said tubing, so that when said input force is applied to said input piston, said output piston generates an output compressive force larger than said input force;
   c. connecting means keeping secured and in proximity said output piston with said top surface of said at least one piezoelectric device so that said output piston applies said output compressive force to said at least one piezoelectric device when said input force is applied to said input piston, whereby said at least one piezoelectric device is compressed with larger than said input force when said input force is applied to said input piston, and thus capable of producing more electricity than if said at least one piezoelectric device were compressed with a force equal to said input force.

2. The electrical power generator of claim 1 wherein: said at least one piezoelectric device is a stack of plates of piezoelectric material.

3. The electrical power generator of claim 1 wherein: said connecting means is a steel structure with special shape mated to the shape of said output piston's tube.

4. The electrical power generator of claim 1 wherein: said input force applied on said input piston is selected from the group including buoys following the rise and fall of ocean waves, gravitational force of vehicles traversing said input piston's location.

5. The electrical power generator of claim 4 further including: a lever arm, having a first end and a second end, pivotally attached to a pivot at a pivot point between said first and second ends; a platform, secured at a fixed position relative to the ocean waves supporting said pivot and said input piston; a buoy, attached to said lever arm's first end, said buoy is in direct communication with the ocean waves; attaching means attaching said lever arm's second end to said input piston for transferring periodic force from the rise and fall of ocean waves to said input piston.

6. The electrical power generator of claim 1 further including: electrodes and electrical circuit means connected to said at least on piezoelectric device for processing and transporting or storing the electricity produced.

\* \* \* \* \*